(12) United States Patent
Urie et al.

(10) Patent No.: US 10,103,903 B2
(45) Date of Patent: Oct. 16, 2018

(54) METHODS AND SYSTEMS FOR IMPROVING COMMUNICATION USING AN ALTERNATE LINK

(71) Applicant: TrellisWare Technologies, Inc., San Diego, CA (US)

(72) Inventors: Marcus T. Urie, San Diego, CA (US); Ryan P. McCourt, Encinitas, CA (US); Cenk Köse, San Diego, CA (US); Keith M. Chugg, La Cañada, CA (US)

(73) Assignee: TRELLISWARE TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 15/667,451

(22) Filed: Aug. 2, 2017

(65) Prior Publication Data

US 2017/0331644 A1 Nov. 16, 2017

Related U.S. Application Data

(63) Continuation-in-part of application No. PCT/US2017/016444, filed on Feb. 3, 2017.
(Continued)

(51) Int. Cl.
*H04B 10/00* (2013.01)
*H04L 25/02* (2006.01)
(Continued)

(52) U.S. Cl.
CPC ..... *H04L 25/0204* (2013.01); *H04B 10/2575* (2013.01); *H04L 25/03057* (2013.01); *H04L 25/03165* (2013.01); *H04L 25/03171* (2013.01)

(58) Field of Classification Search
CPC .......... H04L 25/0204; H04L 25/03057; H04L 25/03171; H04L 25/03165;
(Continued)

(56) References Cited

U.S. PATENT DOCUMENTS 9,391,690 B2 * 7/2016 Jong .................. H04B 7/18513
2006/0251421 A1 11/2006 Arnon
(Continued)

FOREIGN PATENT DOCUMENTS

WO 2017/0136682 8/2017

OTHER PUBLICATIONS

International Search Report and Written Opinion of PCT Application No. PCT/US17/16444 dated May 5, 2017, 17 pages.

*Primary Examiner* — Don N Vo
(74) *Attorney, Agent, or Firm* — Perkins Coie LLP

(57) ABSTRACT

A method and system for maximizing throughput and minimizing latency in a communication system that supports heterogeneous links is presented. The communication system supports a primary link and an alternate link, and the method and system leverage the alternate link to reduce the overhead transmitted over the primary link, thereby increasing throughput and reducing end-to-end latency. The higher latency alternate link provides a delayed version of an information signal that corresponds to a portion of the information signal that is transmitted on the primary link. The received samples from the primary and alternate links may be used to equalize subsequent portions of the information signal received over the primary link, and may also be used for synchronization, timing recovery, DC offset removal, I/Q imbalance compensation, and frequency-offset estimation.

20 Claims, 12 Drawing Sheets

Related U.S. Application Data

(60) Provisional application No. 62/290,774, filed on Feb. 3, 2016.

(51) Int. Cl.
*H04L 25/03* (2006.01)
*H04B 10/2575* (2013.01)

(58) Field of Classification Search
CPC ..... H04L 2025/03426; H04L 25/03343; H04L 1/0003; H04B 17/24; H04B 17/318; H04B 17/309; H04B 10/2575; H04W 72/085
USPC .......................................................... 398/115
See application file for complete search history.

(56) References Cited

U.S. PATENT DOCUMENTS

| | | | |
|---|---|---|---|
| 2011/0002371 A1* | 1/2011 | Forenza | H04B 7/0417 375/227 |
| 2011/0122854 A1 | 5/2011 | De Lind Van Wijngaarden | |
| 2014/0294059 A1 | 10/2014 | Yamagata | |
| 2015/0156777 A1 | 6/2015 | Negus et al. | |
| 2017/0188391 A1* | 6/2017 | Rajagopal | H04W 74/0816 |

\* cited by examiner

METHODS AND SYSTEMS FOR IMPROVING COMMUNICATION USING AN ALTERNATE LINK

CROSS-REFERENCES TO RELATED APPLICATIONS

This application is a continuation-in-part of PCT Application No. PCT/US2017/016444, filed on Feb. 3, 2017, which claims the benefit of U.S. Provisional Application No. 62/290,774, filed on Feb. 3, 2016, each of which are incorporated herein by reference in their entirety for all purposes.

FIELD OF THE INVENTION

The present invention relates to the field of communications, and more specifically, to the field of wireless and optical communication systems when heterogeneous links are available.

BACKGROUND

Communication systems typically comprise a transmitter connected to a receiver via a communication link (referred to as a primary link). In most communication systems, intersymbol interference (ISI) is a common channel impairment that results from the transmitted pulses spreading beyond their allotted time intervals and interfering with neighboring pulses, thereby degrading the performance of the system. Other channel impairments include non-linear effects (e.g. intermodulation distortion) from radio frequency (RF) components in the transmit chain and receive chain. Two common methods of combatting these channel impairments are forward error-correcting codes and equalization.

An equalization approach typically involves filtering the received signal to cancel the channel impairments introduced by the channel. Specifically, an estimate of the channel impulse response is generated at the receiver and used to mitigate the effect of the channel.

Typically, the channel estimate is generated by using pilot or training symbols (known at both the transmitter and receiver), which are transmitted along with data symbols, as shown in FIGS. 1A and 1B. For example, FIG. 1A shows two packets in a time-domain waveform, wherein the payload of each packet is preceded by a set of training symbols. At the receiver, the training symbols are used to generate a channel estimate, which is then used to equalize the subsequent payload. Although training preambles are used, there has always been an effort to minimize their use in order to maximize throughput and minimize the end-to-end latency.

Most communication channels vary with time, but the time over which the channel is considered to be quasi-static is defined as the coherence time of the channel. As shown in FIG. 1A, a training portion must precede each payload portion in a packet since a channel estimate derived for a specific packet cannot be used for the effective equalization of several subsequent packets, since the subsequent packets will typically arrive after the coherence time of the channel has elapsed, and the channel estimate will no longer be representative of the channel.

FIG. 1B shows a time/frequency allocation diagram for an OFDM system; specifically, the subcarriers are shown for an OFDM frequency-domain waveform as a function of time. It is commonplace to use pilot symbols in certain subcarriers to enable the equalization of the data subcarriers, and one possible arrangement of pilots is shown in FIG. 1B. The pilot symbols are used at the receiver to derive a channel estimate, which is subsequently used to equalize the data subcarriers. In both of the scenarios shown in FIGS. 1A and 1B, pilot and training symbols are overhead that reduce the system throughput over the wireless link being used.

More recent OFDM systems employ multiple antennas at both the transmitter and the receiver (MIMO-OFDM), and employ a variety of methods including pilot-aided and data-aided channel estimation in order to equalize the channel at the receiver. As described above, these systems are typically designed to maximize the throughput, or minimize the bit- or packet-error rate or end-to-end latency, over the point-to-point link between the transmitter and the receiver.

SUMMARY

In contrast to using pilots and training symbols as described above, embodiments of the present invention described herein leverage an alternate link between the transmitter and receiver to ensure that the primary link uses a minimal amount of pilot or training symbols. In some embodiments of the present invention, the use of pilots or training may be entirely eliminated. More generally, the embodiments described herein maximize the throughput, minimize the latency, and increase the reliability of the primary link in a system that employs heterogeneous links. That is, an alternate link that may have characteristics that are different from the primary link is used to optimize the performance of only the primary link of the communication system.

Thus, it is an object of the present invention to provide methods and systems, including computer program products, for improving communication using an alternate link. For example, in one embodiment, a method for maximizing throughput, minimizing latency, and increase the reliability in a communication system that supports heterogeneous links comprises receiving a first portion of an information signal over a primary link, wherein the primary link is between a transmitter and a receiver, wherein the transmitter comprises a bit-to-symbol mapper, wherein the receiver comprises an equalizer, receiving a second portion of the information signal over an alternate link, wherein the alternate link is between the transmitter and the receiver, wherein the second portion corresponds to a subset of the first portion, and wherein a latency of the alternate link is greater than a latency of the primary link, generating an estimate of one or more characteristics of at least a portion of a channel based on the first portion and the second portion, and wherein the channel comprises a transformation from an output of the bit-to-symbol mapper to an input of the equalizer, receiving a third portion of the information signal over the primary link, wherein the third portion is received subsequent to the first portion, and equalizing the third portion based on the estimate.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

Figure 1A:
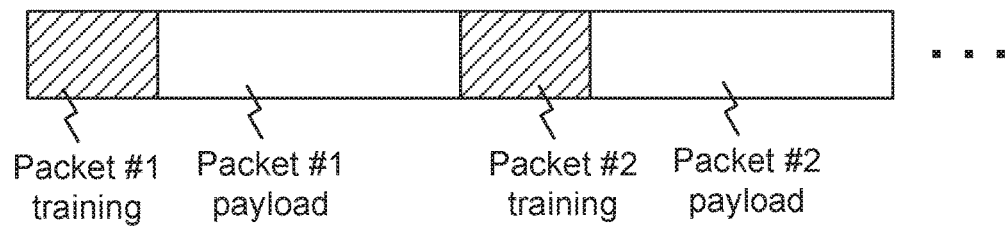
FIGS. 1A and 1B are representative timeslot assignments for existing systems that use pilots for channel estimation.
Figure 1B:
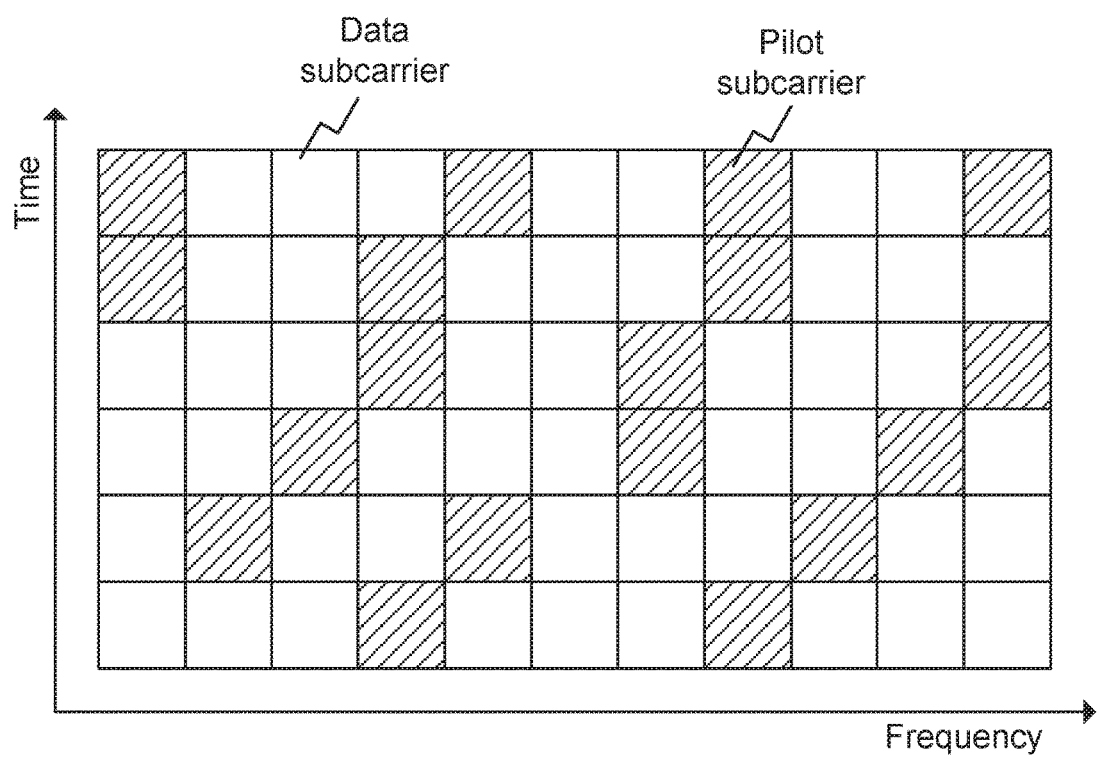

Like labels are used to refer to the same or similar modules in the drawings.

DETAILED DESCRIPTION

Figure 2:
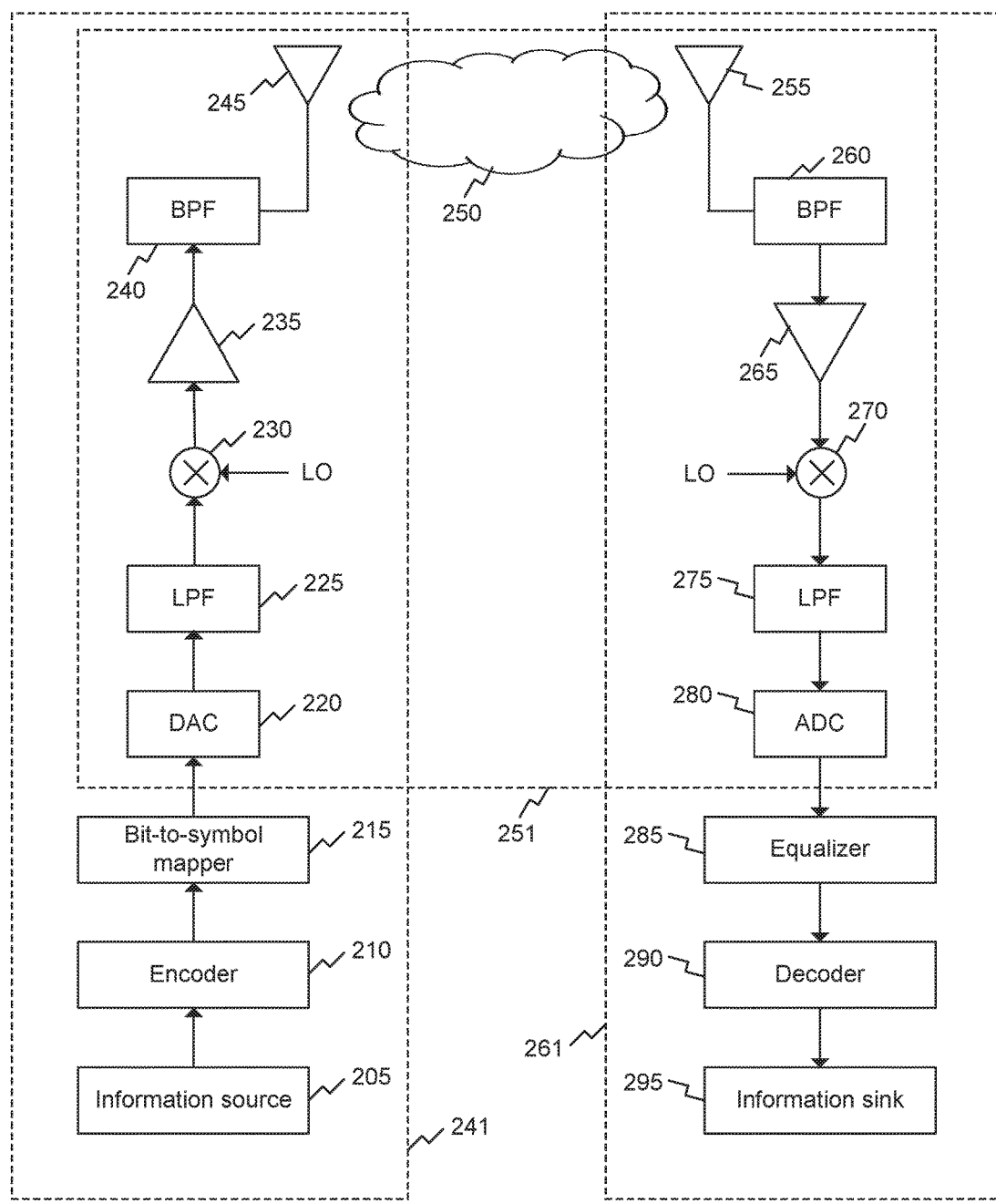
FIG. 2 is a simplified diagram of a communication system highlighting the channel whose estimation enables improving communication using an alternate link, according to embodiments of the present invention.

FIG. 2 is a simplified diagram of a communication system, comprising a transmitter 241 that communicates with a receiver 261 via a transmission medium 250. As shown therein, the transmitter 241 comprises an information source 205, an encoder 210 (which may perform one or more of interleaving, source coding and channel coding functions), and a bit-to-symbol mapper 215 that converts the processed and formatted bit-stream into a stream of symbols based on the modulation. The digital-to-analog converter (DAC) 220 converts the digital modulated symbols into analog samples that are then processed by the RF chain. The analog RF chain comprises a low-pass filter (LPF) 225, a mixer 230 that converts the baseband signal to the carrier frequency, a power amplifier (PA) 235 and a band-pass filter (BPF) 240, and terminates at an antenna 245.

The transmit antenna 245 sends a signal through the transmission medium 250, which is received at an antenna 255 at the receiver 261. The received signal is processed by the receive RF chain comprising a BPF 260, a low-noise amplifier (LNA) 265, a mixer 270 that converts the signal from the carrier frequency down to baseband, and a LPF 275. The analog signal is then converted to digital samples by the analog-to-digital converter (ADC) 280, and processed by an equalizer 285 and a decoder 290, which outputs the decoded bits to the information sink 295.

As discussed previously, the signal is typically distorted by the transmission medium and components in the transmit and receive RF chains. These distortions must be undone, or reversed, at the receiver in order to decode the signal at the receiver. Embodiments of the present invention, which are directed towards improving communication using an alternate link, may generate an estimate of the channel in order to undo the aforementioned distortions. The channel may correspond to the transmission medium 250 in some embodiments, whereas in other embodiments, the channel may correspond to a portion of the transmit chain, the transmission medium, and a portion of the receive chain.

In an example, the channel 251 shown in FIG. 2 may include the DAC, the transmit RF chain, the transmission medium, the receive RF chain, and the ADC. In other embodiments, digital filters may be part of the channel. In general, embodiments of the present invention may refer to the channel as being a transformation from the output of the bit-to-symbol mapper 215 in the transmitter 241 to the input of the equalizer 285 in the receiver 261.

Although FIG. 2 shows an RF-based embodiment that highlights the channel, an optical fiber or free-space optical (FSO) based system comprises a channel that may include only the transmission medium or the transmission medium and other transmit and receive components that may be estimated at the receiver, as part of embodiments of the present invention, as will be described later.

Figure 3A:
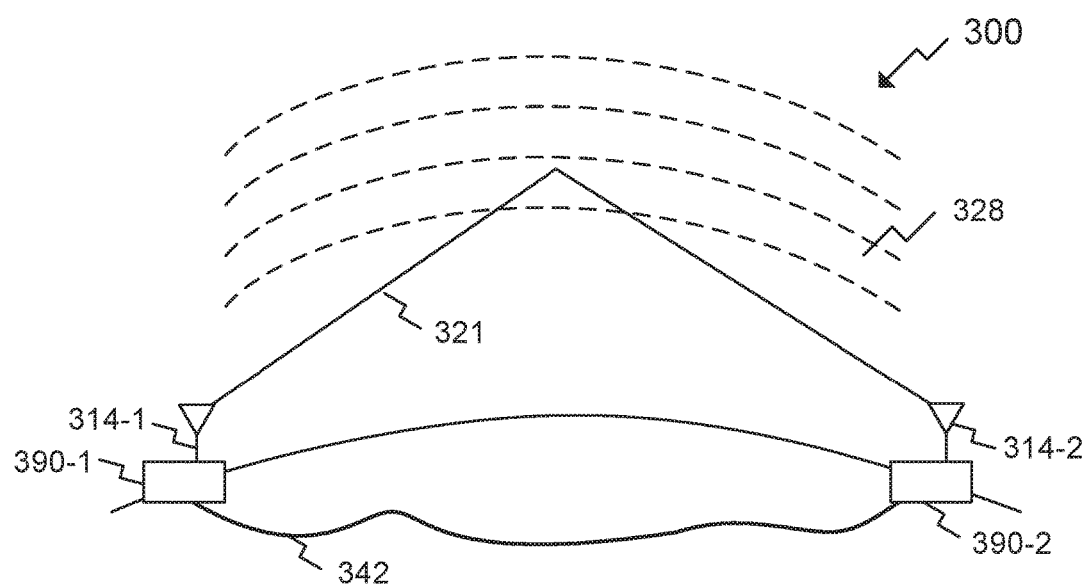
FIGS. 3A, 3B, 3C and 3D are simplified diagrams of systems with heterogeneous links that implement methods to improve communication using an alternate link, according to embodiments of the present invention.

FIGS. 3A, 3B, 3C and 3D are simplified diagrams of systems that may implement methods for improving communication using an alternate link, thereby increasing throughput and minimizing latency, according to embodiments of the present invention. As seen in FIG. 3A, a transmitter 390-1 is communicating with a receiver 390-2 using heterogeneous links. The examples used herein refer to transmitters and receivers, but the transmitter and/or the receiver in each example may be a transceiver in some embodiments. The heterogeneous links in FIG. 3A include a fiber optic link 342 and a wireless over-the-horizon link 321 that is transmitted and received using antennas 314-1 and 314-2, respectively. In an embodiment, the wireless over-the-horizon link is a high-frequency (HF) link operating in the range 2 MHz to 40 MHz, and bouncing off layers of the ionosphere 328. Since light typically travels around 30% slower in an optical fiber as compared to free space, the HF link has a lower latency compared to the fiber optic link. An information signal is transmitted simultaneously on both the HF link and the fiber optic cable, but the information signal from the optical fiber is received some time after the information signal from the HF link is received.

Embodiments of the present invention that reduce the latency of the wireless link are directed towards reducing the end-to-end latency of the primary link. That is, the time taken between bits being available to the transmitter (before modulation, coding, scrambling, etc.) and being output from the receiver (after equalization, decoding, demodulation, etc.), which includes the propagation time over the wireless channel. The alternate link which transmits portions of the information signal that correspond to the information signal transmitted over the wireless link is used to maximize the throughput and reduce the end-to-end latency of the primary link.

In other embodiments of the present invention, the primary link may be a free-space optical (FSO) link, or span many of the usable portions of the RF spectrum. For example, the wireless link may be a very high frequency (VHF) link operating in the range of 40 MHz to 300 MHz, an ultra-high frequency (UHF) link operating in the range of 300 MHz to 2 GHz, a microwave link operating at a frequency in the range of 2 GHz and 90 GHz, or another frequency range. The embodiments of the present invention described above comprise heterogeneous links that are generally defined as a primary link and an alternate link, with the primary link having a lower latency than the alternate link, but the alternate link having a higher reliability than the primary link.

More generally, since the same information signal is transmitted on both the primary link and the alternate link, the delayed information signal from the alternate link may be used to maximize throughput and reduce the end-to-end latency over the primary link. Although the same information signal is transmitted on both the primary and alternate links, embodiments of the present invention discussed below describe that the information signal need not necessarily be transmitted identically over the heterogeneous links. In fact, there may be advantages to transmitting the information signal on the alternate link in a format that is different to that transmitted on the primary link.

For example, the primary link may be any wireless link that is transmitting an uncoded signal; i.e. an information signal that has not been processed by a forward error-correcting (FEC) code. In this embodiment, the alternate link may be a similar wireless link with the addition of an FEC code. That is, the alternate link that comprises the redundancy of the FEC has a higher end-to-end latency and a greater reliability than the wireless link that transmits the information signal with no FEC coding. In an embodiment, the primary link may be a link that is encoded using a first type of FEC, and the alternate link is a link encoded with a second type of FEC, wherein the second type of FEC may have a larger block size and/or a lower code rate. Thus, the alternate link will be more reliable, but have a higher latency, than the primary link.

These embodiments of the present invention may also be used with minimal pilots and/or training symbols, or none at all, as discussed above. Other embodiments may transmit the information signal in different formats (coded, uncoded, etc.) on the primary and alternate links, some of which have been described above. However, the alternate link transmits a portion of the information signal that corresponds to a portion of the information signal that is transmitted over the primary link, and received prior to the alternate link transmission.

Figure 3B:
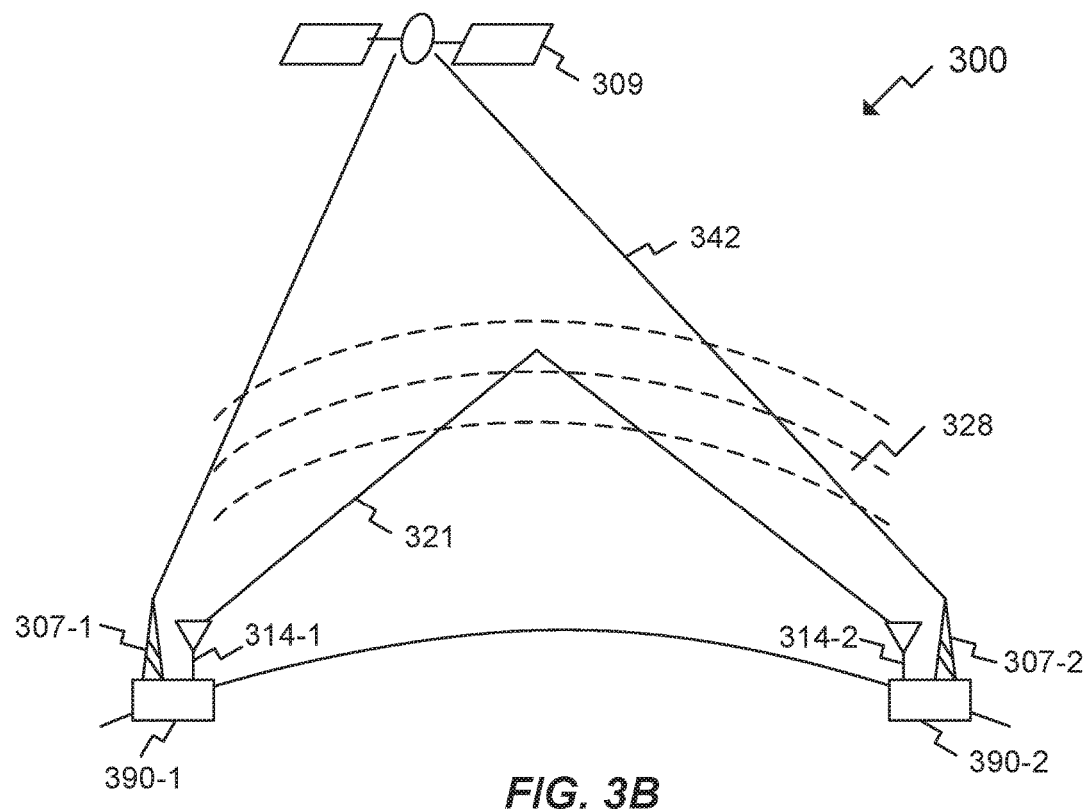

FIG. 3B shows a system incorporating an embodiment of the present invention, where a satellite link 342 is the alternate link with a greater latency than the primary link 321, which is an HF link. In this embodiment, the transmitter 390-1 and the receiver 390-2 are each equipped with antennas that support both satellite communications (antennas 307-1 and 307-2, respectively) as well as HF communications (antennas 314-1 and 314-2, respectively). In other embodiments, the primary link may be a wireless tropospheric scatter link.

Figure 3C:
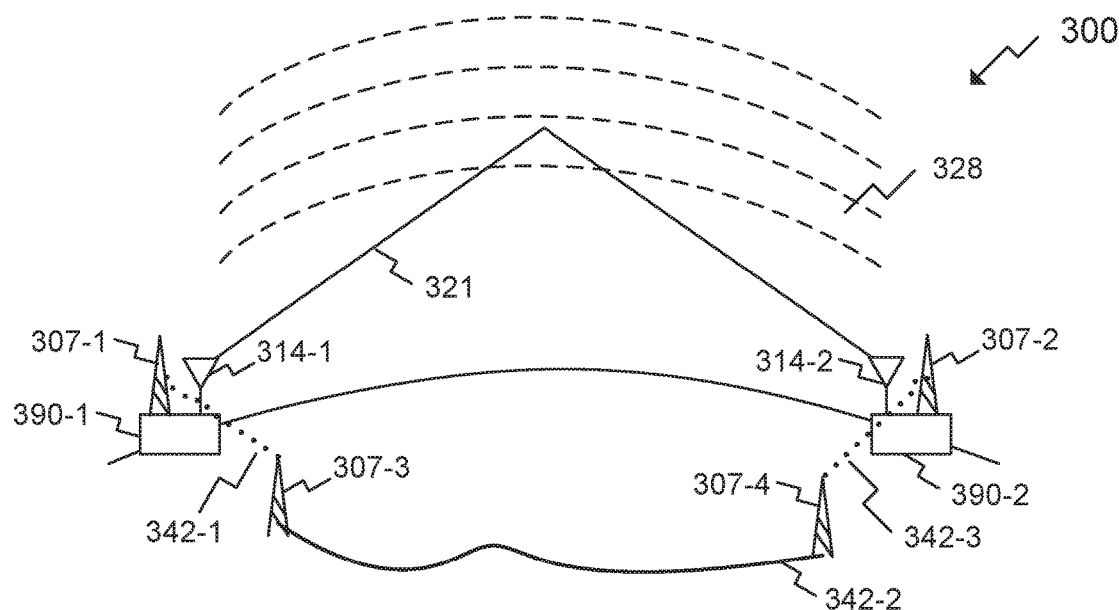

FIG. 3C shows a system, similar to that described in FIG. 3A, incorporating an embodiment of the present invention, where the primary link 321 is a wireless HF link that uses antennas 314-1 and 314-2 at the transmitter 390-1 and receiver 390-2, respectively. Herein, the alternate link comprises different sections as shown in FIG. 3C. Specifically, the alternate link from the transmitter 390-1 to the receiver 390-2 comprises a first microwave link 342-1 (which uses microwave antennas 307-1 and 307-3), a fiber optic link 342-2, and a second microwave link 342-3 (which uses microwave antennas 307-4 and 307-2). In contrast to FIG. 3A in which the alternate link is a fiber optic link, the alternate link in FIG. 3C comprises a fiber optic link portion as well as wireless link portions. Thus, other embodiments of the present invention not specifically described herein may have primary and alternate links that are segmented, with each segment possibly using a different communication technology or method.

Figure 3D:
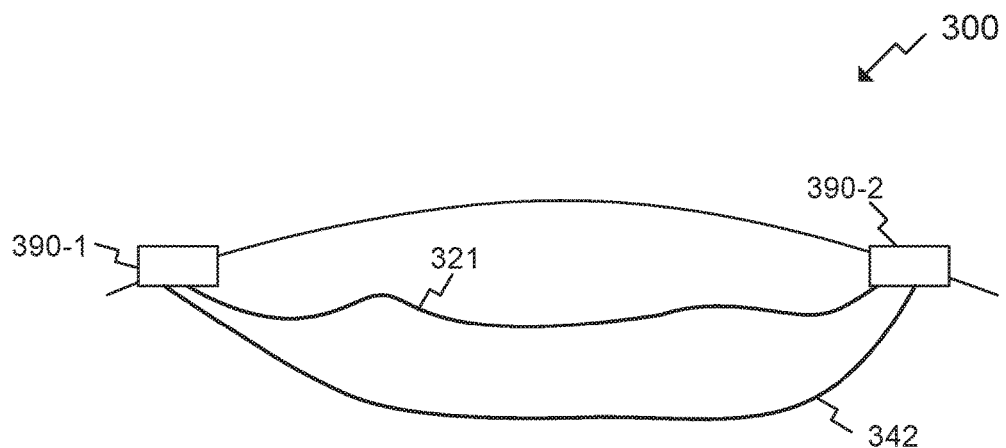

FIG. 3D shows a system incorporating an embodiment of the present invention, where the primary link 321 is a first type of fiber optic link and the alternate link 342 is a second type of fiber optic link, wherein the primary link has a latency that is lower than that of the alternate link. In an example, the primary link may be a low-latency 100 G (gigabit) fiber optic link, whereas the alternate link may be a conventional 100 G fiber optic link (with a higher latency). Other types of fiber optic links (e.g. 10 G, 25 G, or 50 G) may also be employed. In some embodiments, the first and second types of fiber optic links between the transmitter 390-1 and the receiver 390-2 may support different rates, with the first type of fiber optic link having a lower latency than the second type of fiber optic link.

As discussed previously, the higher latency fiber optic link 342 is used to equalize samples received over the low-latency fiber optic link 321, which may be subject to waveguide dispersion (due to the waveguide geometry). Furthermore, optical fiber transmissions are subject to pulse broadening that can result in polarization mode dispersion (since a single wavelength of light comprises two polarization modes). These fiber optic link impairments may be mitigated by receiving redundant information on the alternate link.

Figure 4A:
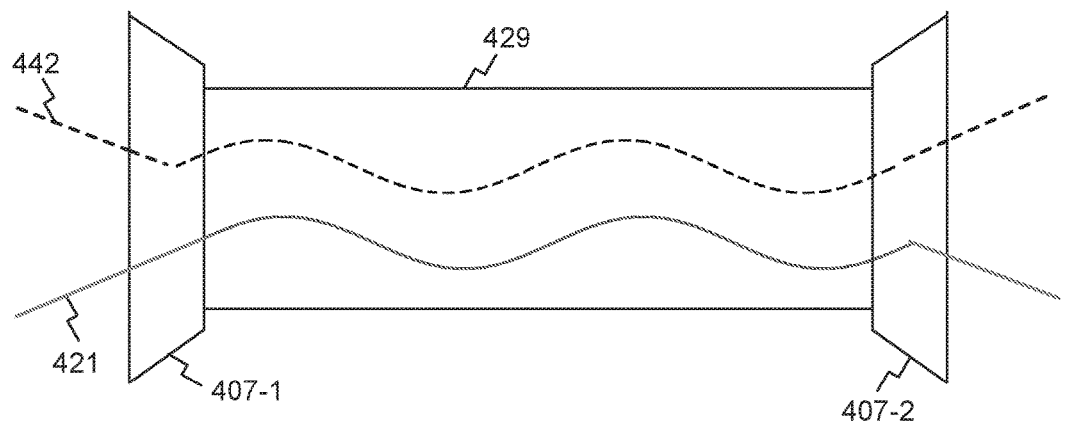
FIGS. 4A, 4B and 4C are simplified diagrams of systems with heterogeneous links that employ a common transmission medium, which implement methods to improve communication using an alternate link, according to embodiments of the present invention.
Figure 4B:
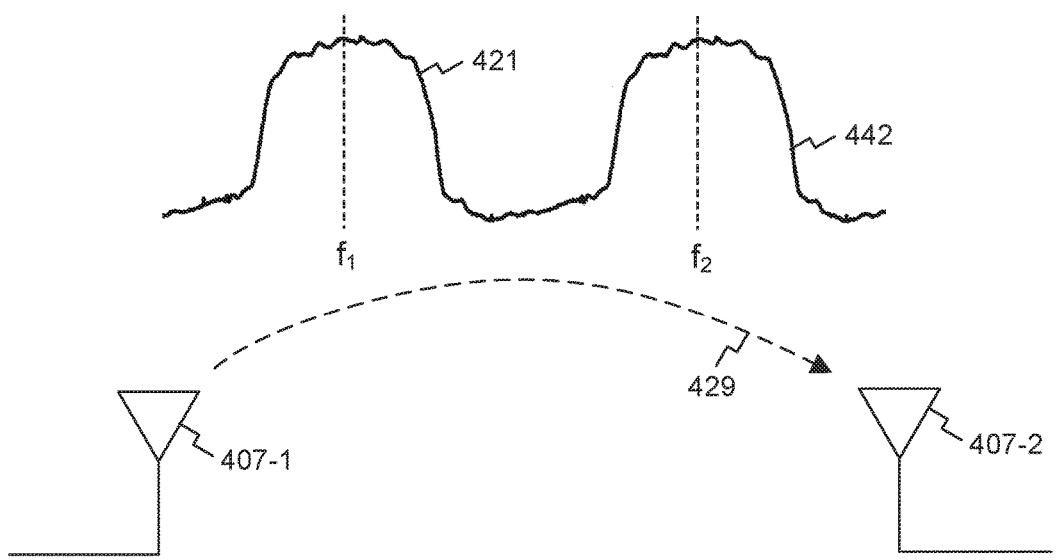
Figure 4C:
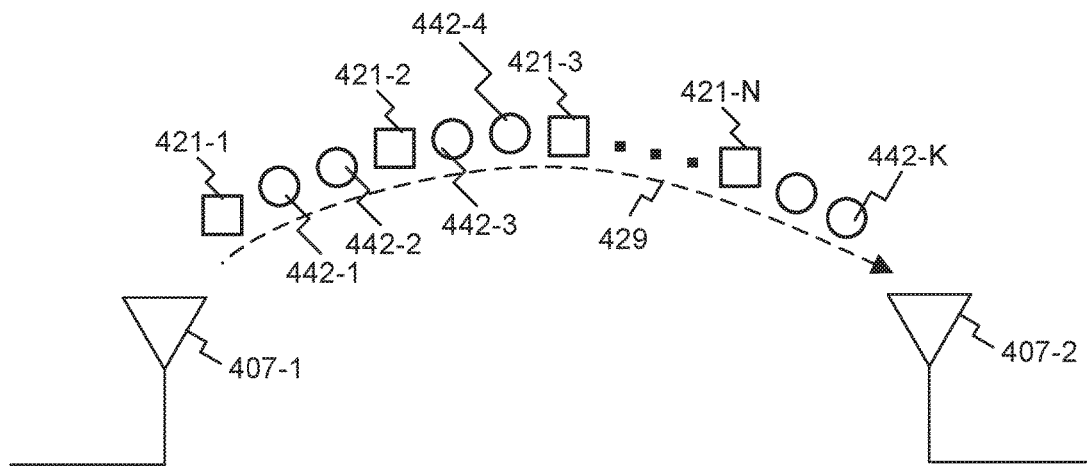

FIGS. 4A, 4B and 4C are simplified diagrams of systems with heterogeneous links that employ a common transmission medium, which implement methods to improve communication using an alternate link, according to embodiments of the present invention. In the embodiment shown in FIG. 4A, a single-mode optical fiber 429 (which acts as a waveguide) may be used to carry both the primary link 421 corresponding to a first wavelength of light and the alternate link 442 corresponding to a second wavelength of light. In an embodiment, a multiplexer 407-1 may multiplex two different wavelengths of light (for example, 1551 nm (nanometers) and 1531 nm) to transmit them over the single-mode optical fiber 429, and a demultiplexer 407-2 at the receiver splits them apart. FIG. 4A is an example of wavelength-dimension multiplexing (WDM) in which the propagation of light of different wavelengths are quasi-orthogonal, as will be further discussed below.

FIG. 4B shows an RF system wherein the transmit antenna 407-1 communicates with the receiver antenna 407-2 through the free space transmission medium 429. In an embodiment, the primary link 421 and the alternate link 442 are two distinct portions of the frequency spectrum that use carrier frequencies $f_1$ and $f_2$, respectively. That is, a single transceiver may output the information signal that is communicated through both the primary and alternate links based on frequency-division multiplexing (FDM).

FIG. 4C shows a system, similar to the FDM system shown in FIG. 4B, but based on time-division multiplexing (TDM). In an embodiment, the low-latency primary link comprises uncoded symbols (421-1, 421-2, 421-3 . . . 421-N) that may be equalized and decoded upon reception at the receiver antenna 407-2. The higher latency alternate link may comprise symbols (442-1, 442-2, 442-3, 442-4 . . . 442-K) that form a block code of length K, which can be decoded only when all K symbols have been received. That is, the uncoded symbols and the coded block symbols may be interleaved (either uniformly as shown in FIG. 4C, or non-uniformly, or randomly) to provide the heterogeneous links over a common transmission medium.

More generally, embodiments of the present invention may use any two orthogonal or quasi-orthogonal dimensions in a common transmission medium. In addition to the embodiments described in the context of FIGS. 4A, 4B and 4C, different frequency-hopping patterns may be used by the primary and alternate links. In another embodiment, the primary link may be used to transmit the systematic bits of a systematic code, and the alternate link may be used to transmit the parity bits of the systematic code. Using a systematic code in this manner results in the alternate link being more reliable and having a greater latency that the primary link. Other quasi-orthogonal or orthogonal dimensions based on time, space, frequency and coding may be used to implements embodiments of the present invention.

Figure 5:
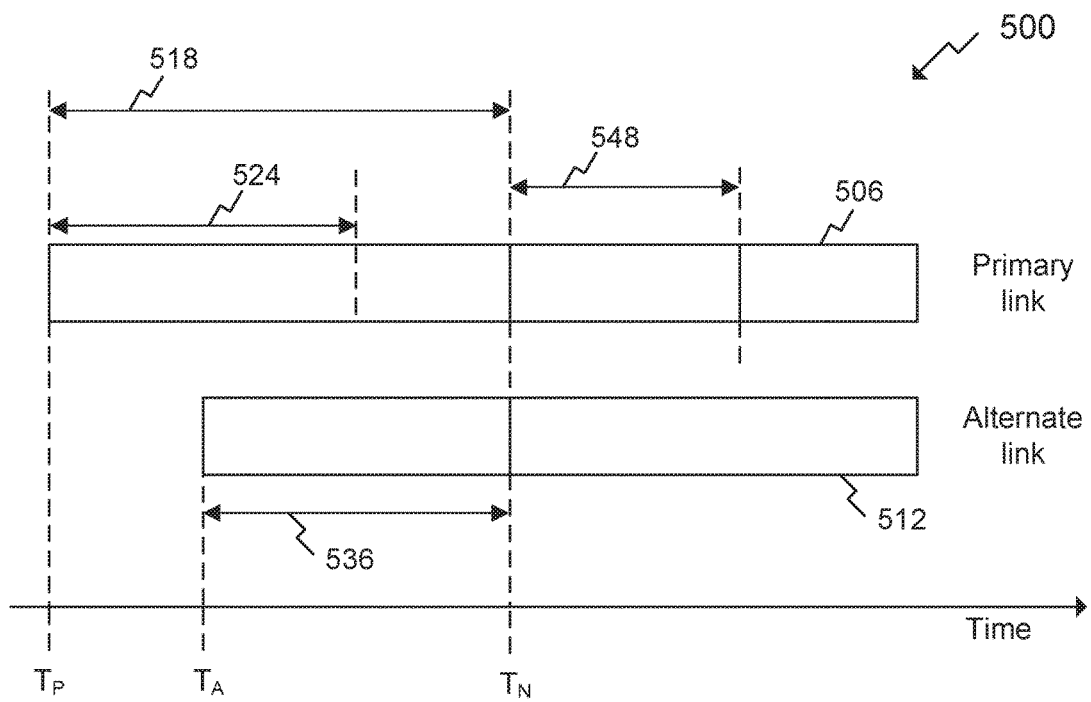
FIG. 5 is a timing diagram illustrating a method for improving communication using an alternate link, according to an embodiment of the present invention.

FIG. 5 is a timing diagram of a method for improving communication using an alternate link, thereby increasing throughput and minimizing latency, according to an embodiment of the present invention. An information signal on the primary link 506 is received at time $T_P$, and a signal corresponding to the same information signal is received on the alternate link 512 at time $T_A$, where $T_A-T_P$ is defined as the differential latency of the system with heterogeneous links.

At time $T_N$, a first portion 518 of the information signal is received over the primary link, and a second portion 536 of the information signal is received over the alternate link. As shown in FIG. 5, the first portion 518 comprises a subset 524, which due to the differential latency of the system, corresponds to the second portion 536 of the information signal. The subset of the first portion and the second portion can be used, in an embodiment, to support the equalization of a third portion 548 of the information signal, which is received over the primary link after the first portion 518 has been received. In other embodiments, the subset of the first portion and the second portion (which correspond to each other) can be used for one or more of frequency-offset estimation, timing recovery, direct current (DC) offset removal, in-phase and quadrature (I/Q) imbalance compensation, and synchronization.

As discussed above, the second portion 536 received over the alternate link corresponds to the subset 524 of the first portion 518 received over the primary link. In an embodiment, modulated symbols can be transmitted on both the primary link and the alternate link, but the modulation used in each of the link need not be the same. In the context of FIG. 3A, the wireless link may transmit quadrature phase shift keying (QPSK) symbols, whereas the fiber optic link may employ OOK (on-off keying) symbols that are more reliable. In other embodiments, such as described in FIG. 3B, both the satellite and HF links may both transmit QPSK (or higher-order modulations, e.g. 16-QAM, 64-QAM) or continuous phase modulation (CPM) symbols.

In other embodiments, the alternate link may transmit only a fraction of the data that was transmitted on the primary link, or may use compression or compressive sensing to transmit a reduced accuracy copy of the information signal being transmitted over the primary link. In each of these embodiments, the alternate link is leveraged in order to maximize throughput and minimize latency of the wireless link, thereby improving communication.

In an embodiment, the communication system with heterogeneous links may be packet-based or streaming. That is, the information signal may be divided into packets and each packet may be simultaneously transmitted on the primary and alternate links. On the receipt of a packet on the alternate link, an initial portion of the packet may be used in conjunction with the corresponding initial portion of the packet from the primary link to generate a channel estimate. The remainder of the packet may then be equalized using the channel estimate. Channel estimates may be generated for each packet, or less frequently (e.g. every $N^{th}$ packet), based on the coherence time of the primary channel. On the other hand, if the channel is rapidly evolving, channel estimates may be generated multiple times over the length of the packet.

On the other hand, FIG. 5 may also be applicable to a streaming information signal that has not been packetized. In this embodiment, the channel estimate may either be adapted based on updated portions of the information signal received over the primary and alternate links, or periodically re-estimated, or a combination of both.

Figure 6A:
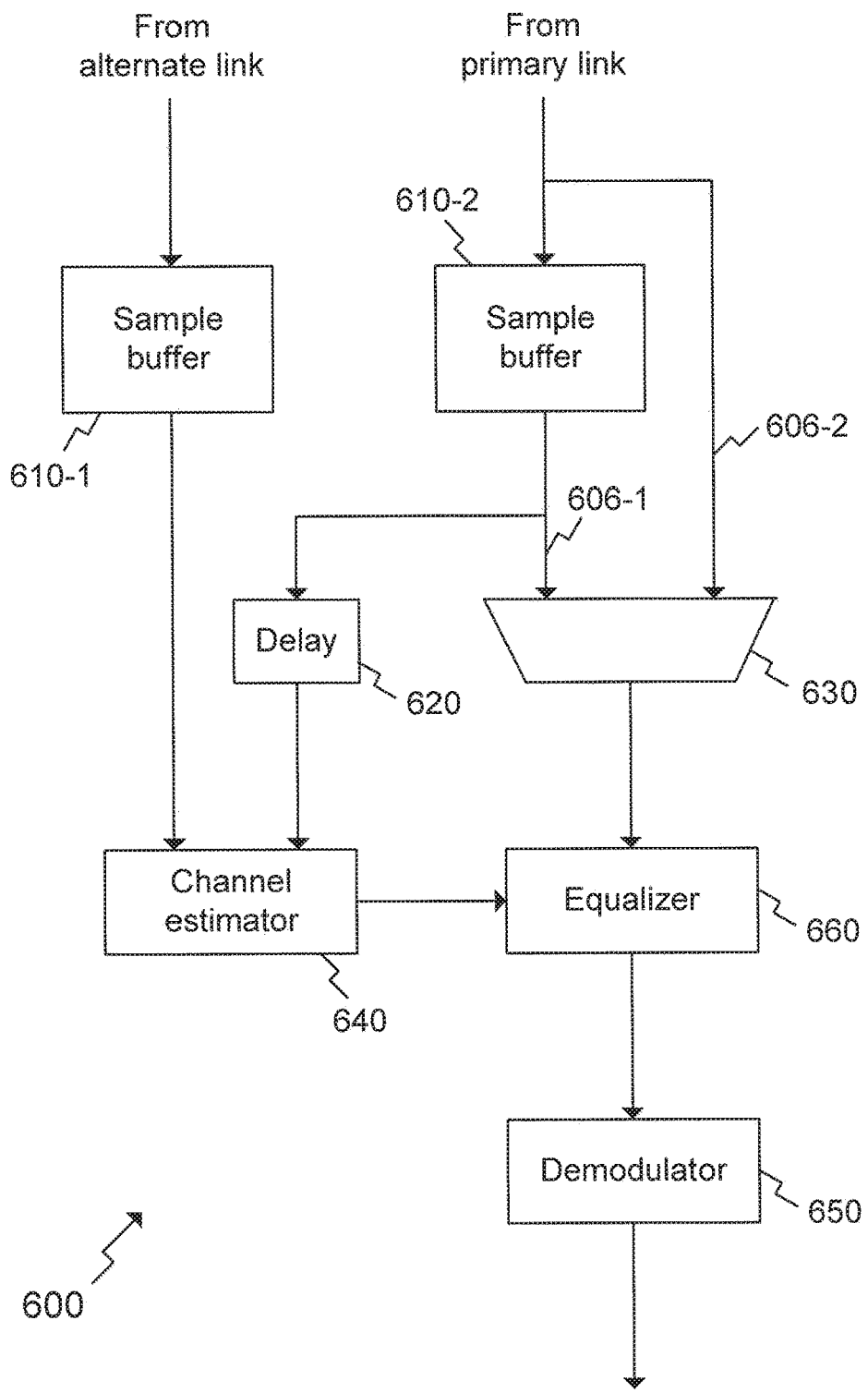
FIGS. 6A and 6B are simplified diagrams of a receiver structures for improving communication using an alternate link, according to embodiments of the present invention.

FIG. 6A is a block diagram of a receiver structure for improving communication using an alternate link, thereby maximizing throughput and minimizing latency in a communication system that supports heterogeneous links, according to an embodiment of the present invention. As shown in FIG. 6A, the wireless and alternate links are inputs to the receiver. Samples from the higher latency alternate link are buffered in a sample buffer 610-1, whereas the samples from the wireless link are used differently, depending on when they are received. In the context of FIG. 5, the subset of the first portion of the samples is stored in another sample buffer 610-2. These samples 606-1 are delayed using a delay element 620 in order to time-align them with the samples from the higher latency alternate link, and then sent to a channel estimator 640, which also receives the samples from the sample buffer 610-1.

A multiplexer 630 is used to control which portion of the wireless link samples are sent to an equalizer 660, which also receives an estimate of the channel that is generated by the channel estimator 640. In an embodiment, the third portion of samples 606-2 is passed through the multiplexer to be equalized. The equalizer 660 may be either a linear equalizer or a non-linear equalizer. In an embodiment, a linear equalizer may be a zero-forcing equalizer or a minimum mean-squared error (MMSE) equalizer, and the non-linear equalizer may be a maximum a posteriori (MAP) equalizer, a maximum likelihood (ML) equalizer, a decision feedback equalizer (DFE), or a neural network equalizer. The equalized samples may subsequently be processed by a demodulator 650.

Figure 6B:
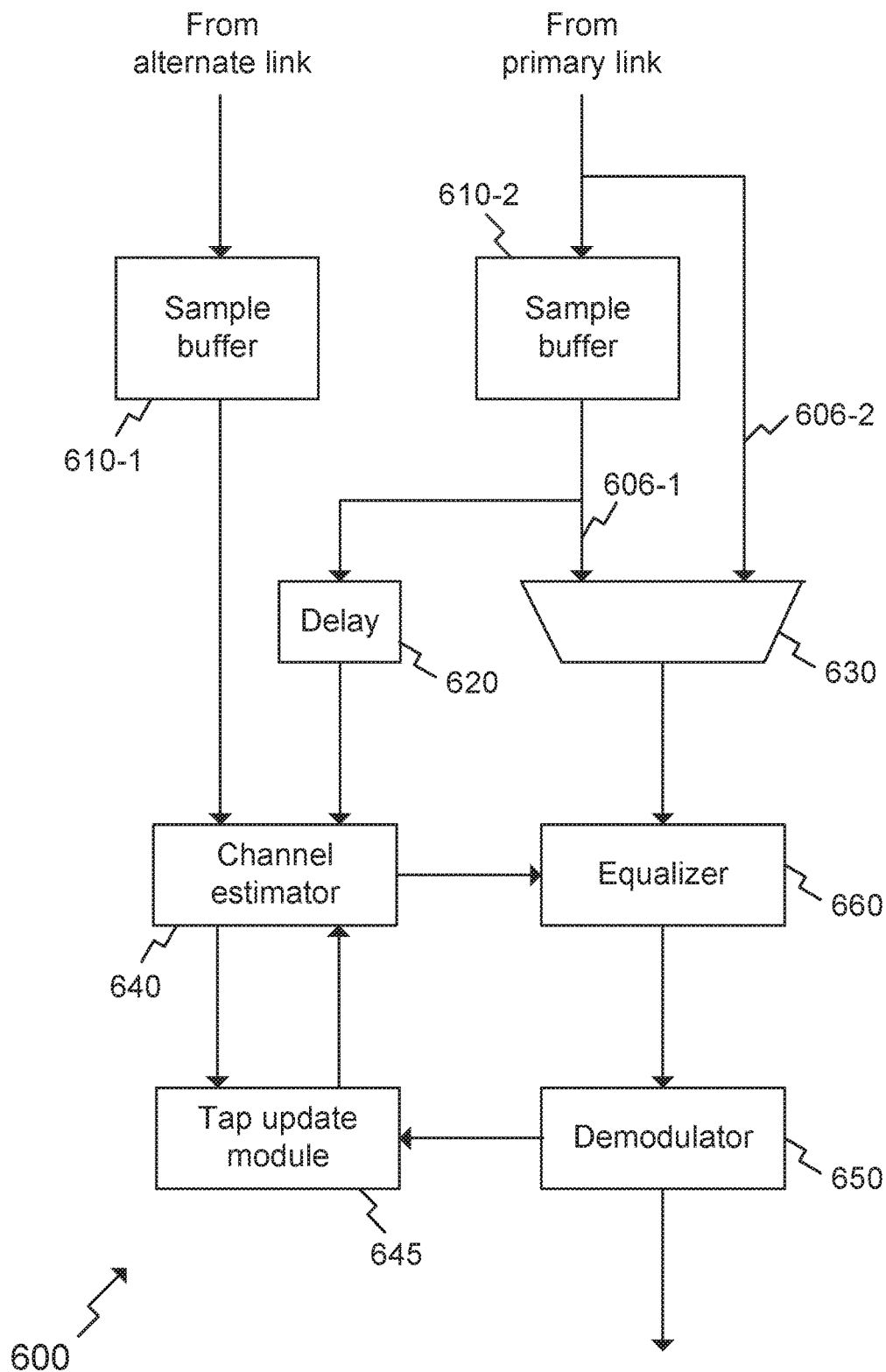

FIG. 6B is a block diagram of another receiver structure for improving communication using an alternate link, thereby maximizing throughput and minimizing latency in a communication system that supports heterogeneous links, according to an embodiment of the present invention. This block diagram includes some modules or blocks that are similar to those shown in FIG. 6A and described above. At least some of these blocks or modules may not be separately described in this section.

In FIG. 6B, the demodulated symbols (or the bits derived from the demodulated symbols) may be used by a tap update module 645 in order to update, or adapt, the taps of the channel estimate generated by the channel estimator 640. An updated channel estimate may then be used in the equalizer 660 to equalize subsequent portions of the information signal that are received over the wireless channel subsequent to the first portion of the information signal.

Figure 7:
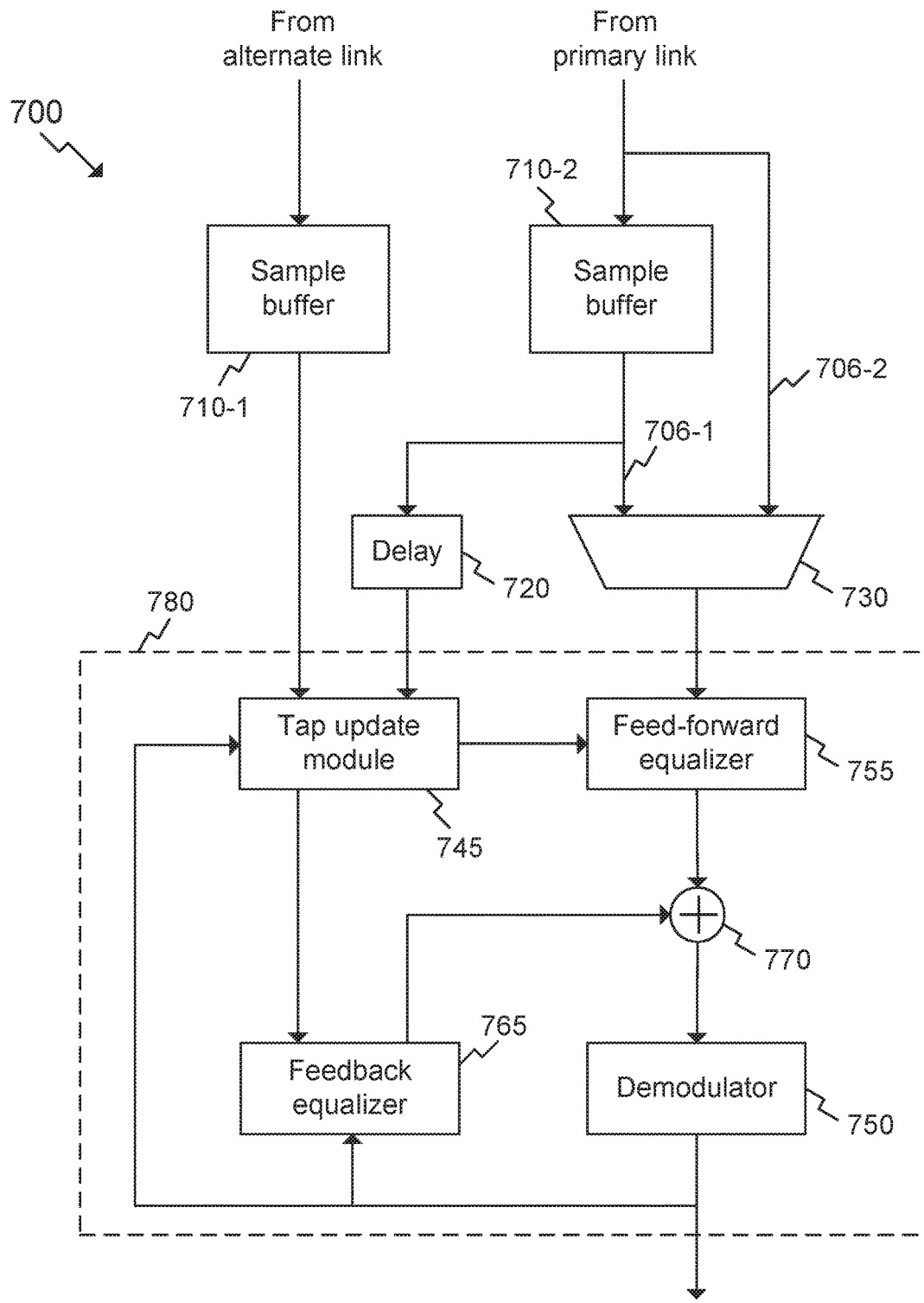
FIG. 7 is a simplified diagram of another receiver structure for improving communication using an alternate link, according to an embodiment of the present invention.

FIG. 7 is a block diagram of yet another receiver structure for improving communication using an alternate link, thereby maximizing throughput and minimizing latency in a communication system that supports heterogeneous links, according to an embodiment of the present invention. This block diagram includes some modules or blocks that are similar to those shown in FIGS. 6A and 6B, and described above. At least some of these blocks or modules may not be separately described in this section.

The receiver structure of FIG. 7 uses a decision feedback equalizer (DFE) 780, and does not generate an explicit channel estimate. The DFE 780 comprises a tap update module 745, a feedforward equalizer 755, a feedback equalizer 765, a summer 770 and the demodulator 750. In contrast to generating an explicit channel estimate, a tap update module 745 receives a delayed (and therefore time-aligned) version of the first subset 706-1 of the first portion of samples that were stored in a sample buffer 710-2, and the second portion of samples that were stored in another sample buffer 710-1, and directly updates the taps of either the feedforward equalizer 755, or the feedback equalizer 765, or both.

The tap update module 745 adapts the feedforward equalizer taps using the output of the demodulator 750, and based on a least-squares algorithm. In an embodiment, the least-squares algorithm may be one of least mean squares, normalized least mean squares, batch least squares, recursive least squares, lattice recursive least squares, normalized lattice recursive least squares, and the like.

Figure 8:
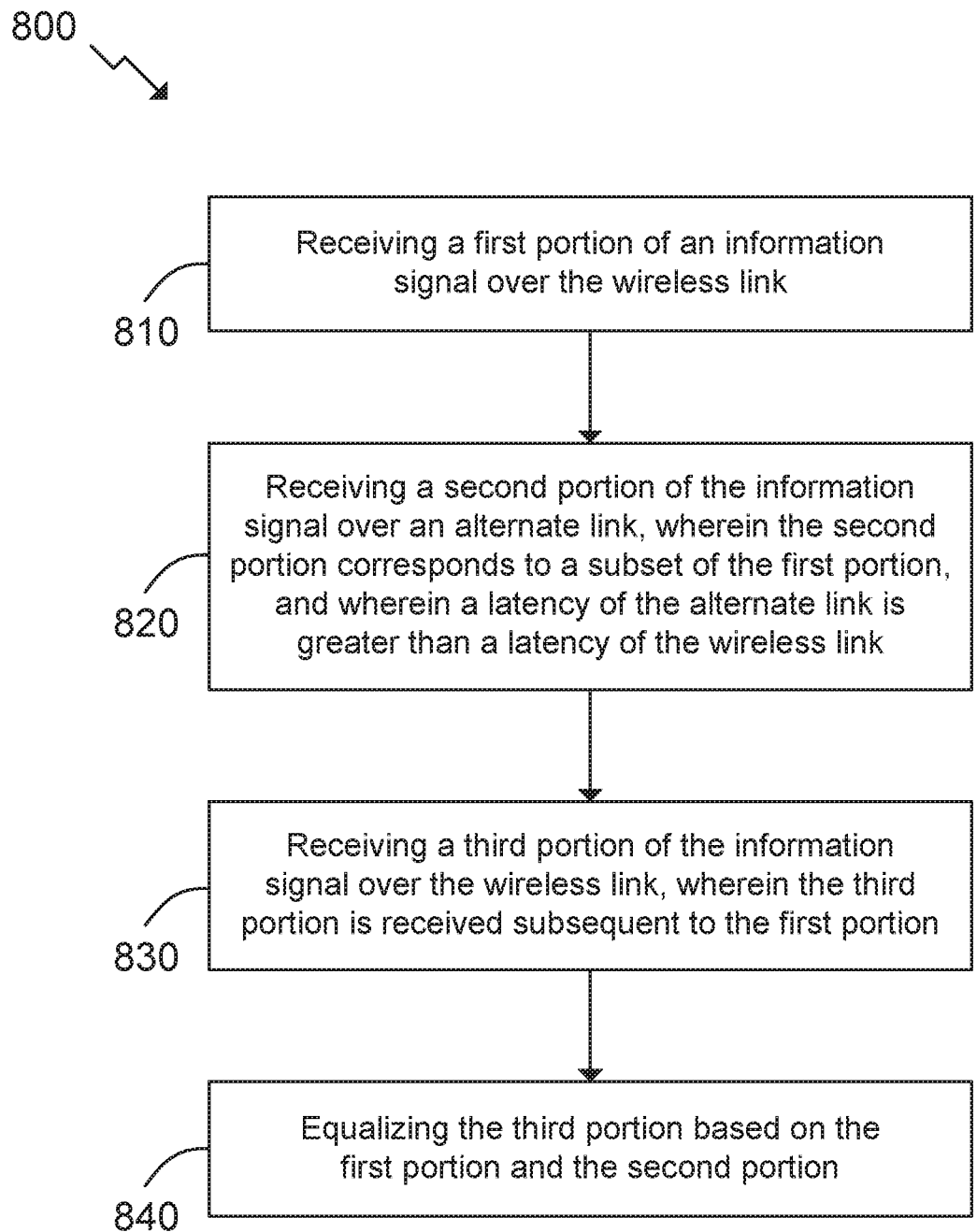
FIG. 8 is a flowchart for a method for improving communication using an alternate link, according to an embodiment of the present invention.

FIG. 8 is a flowchart for a method for improving communication using an alternate link, thereby maximizing throughput and minimizing latency, according to an embodiment of the present invention. In some embodiments, the order of the steps may be changed. Furthermore, some of the steps in the flowchart may be skipped or additional steps added.

The method begins at step 810, wherein a first portion of an information signal is received over the wireless link. In some embodiments of the present invention, the first portion comprises modulated symbols. For example, QAM or CPM may be used to modulate the information signal over the wireless link.

At step 820, a second portion of the information signal is received over an alternate link, which may be a fiber optic link with a higher latency than the wireless link. In an embodiment, modulated symbols may be transmitted over the alternate link. The modulated symbols transmitted over the alternate link in the second portion correspond to the modulated symbols received in a subset of the first portion received over the wireless link. These two sets of modulated symbol may be used to derive a channel estimate, update the taps of an equalizer, for synchronization, timing recovery, or frequency offset estimation.

In another embodiment, uncoded bits are sent over the alternate link. These uncoded bits in the second portion correspond to the modulated symbols sent over the wireless link in a subset of the first portion. That is, the bits from the alternate link may be modulated (using a modulator) at the receiver to generate a set of reference modulated symbols that may be used in conjunction with the modulated symbols sent over the wireless link to generate an explicit channel estimate by correlating the two sets of symbols, and/or to update the taps of an equalizer or the channel estimate itself.

In step 830, a third portion of the information signal is received over the wireless link subsequent to the reception of the first portion of the information signal, and in step 840, the third portion may be equalized based on the subset of the first portion and the second portion of the information signal as discussed above. In steady-state operation of the system, any portion of the information signal received over the higher latency alternate link may be immediately used with the corresponding portion from the wireless link to generate or update the channel estimate, which is then used to equalize a subsequent portion of the information signal received on the wireless link.

That is, once a channel estimate has been generated based on a portion of the information signal from the alternate link and the corresponding portion of the information signal from the wireless link, subsequent portions of the information signal received on the wireless link may be equalized. However, as discussed previously, the channel estimate may either be updated or re-estimated periodically, based on the coherence time of the channel.

Since the second portion of the information signal received over the alternate link is similar to training and/or pilot symbols, it may be used to equalize a subsequent portion of the information signal as described above. As discussed above, it may be used to synchronize the system, or refine the symbol timing of the system. In an embodiment that uses a streaming information signal, the corresponding portions of the information signal received over the wireless and alternate links may be used to prevent bit-slips, which may occur due to clock drifts at either or both ends of the system. That is, the alternate link may be leveraged to serve a purpose similar to acquisition sequences in traditional communication systems.

In other embodiments, the corresponding portions of the information signal received over the wireless and alternate links may be used to derive a maximum likelihood estimate of the time delay, which may account for the propagation time between the transmitter and the receiver, as well as any clock drift that may exist.

Figure 9:
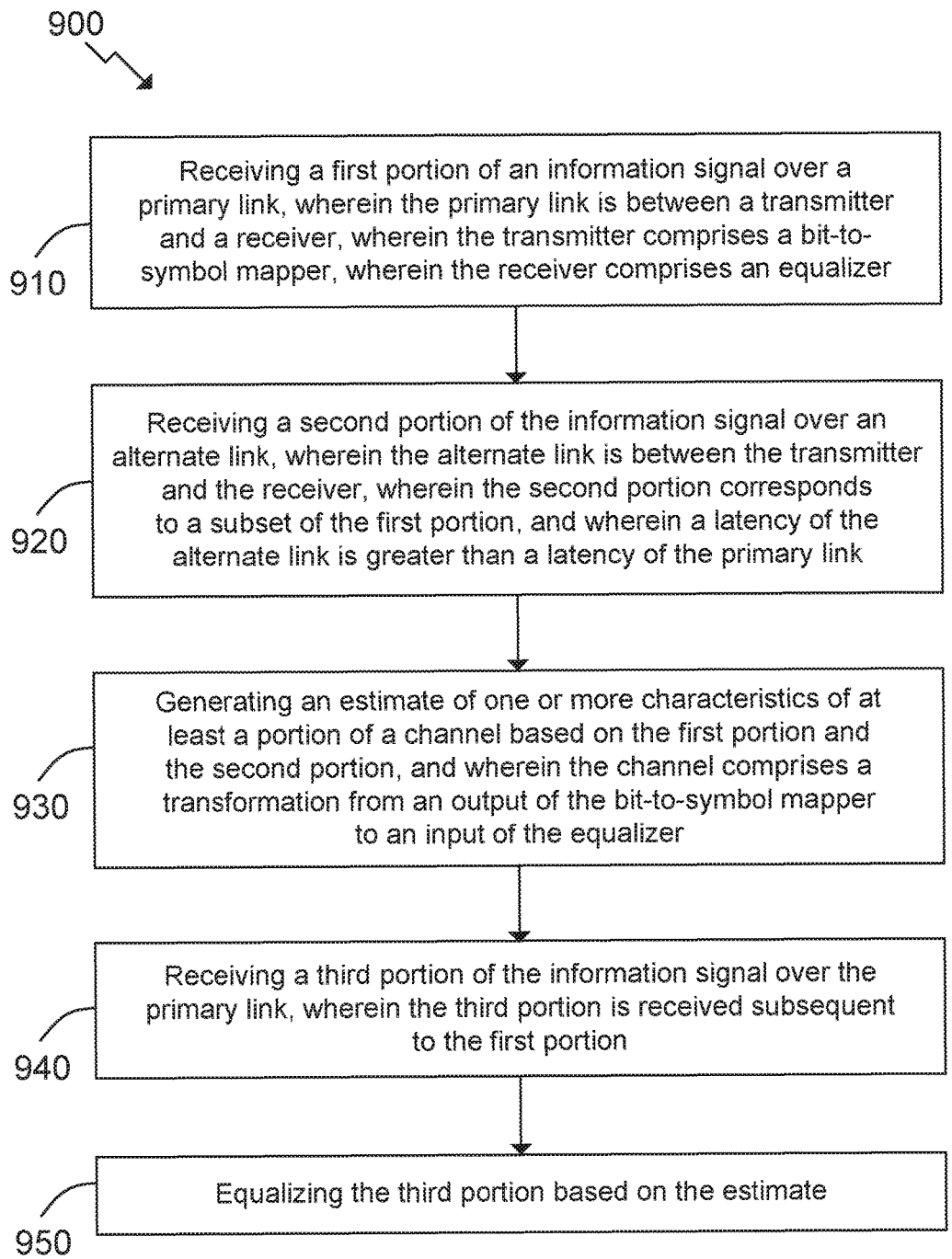
FIG. 9 is a flowchart for another method for improving communication using an alternate link, according to an embodiment of the present invention.

FIG. 9 is a flowchart for another method for improving communication using an alternate link, according to an embodiment of the present invention. In some embodiments, the order of the steps may be changed. Furthermore, some of the steps in the flowchart may be skipped or additional steps added. This flowchart includes some steps that are similar to those shown in FIG. 8 and described above. At least some of the steps may not be separately described in this section.

The method begins at step 910, wherein a transmitter (that comprises a bit-to-symbol mapper) communicates with a receiver (that comprises an equalizer) using a primary link through a channel, over which a first portion of an information signal is received at the receiver. At step 920, a second portion of the information signal is received over an alternate link between the transmitter and receiver, wherein the second portion corresponds to a subset of the first portion, and wherein the latency of the alternate link is greater than that of the primary link.

At step 930, the receiver generates one or more characteristics of at least a portion of the channel based on the first portion and the second portion. As discussed previously, the channel may correspond to the transmission medium, and more generally, may be defined as a transformation between the output of the bit-to-symbol mapper and the input of the equalizer. In an embodiment, the estimate may comprise a channel estimate, and in another embodiment, the estimate may comprise filter taps that model the inverse of the channel.

At step 940, a third portion of the information signal is received over the primary link, and subsequent to the first portion. At step 950, the third portion is equalized based on the generated estimate of the one or more characteristics of at least a portion of the channel.

Figure 10A:
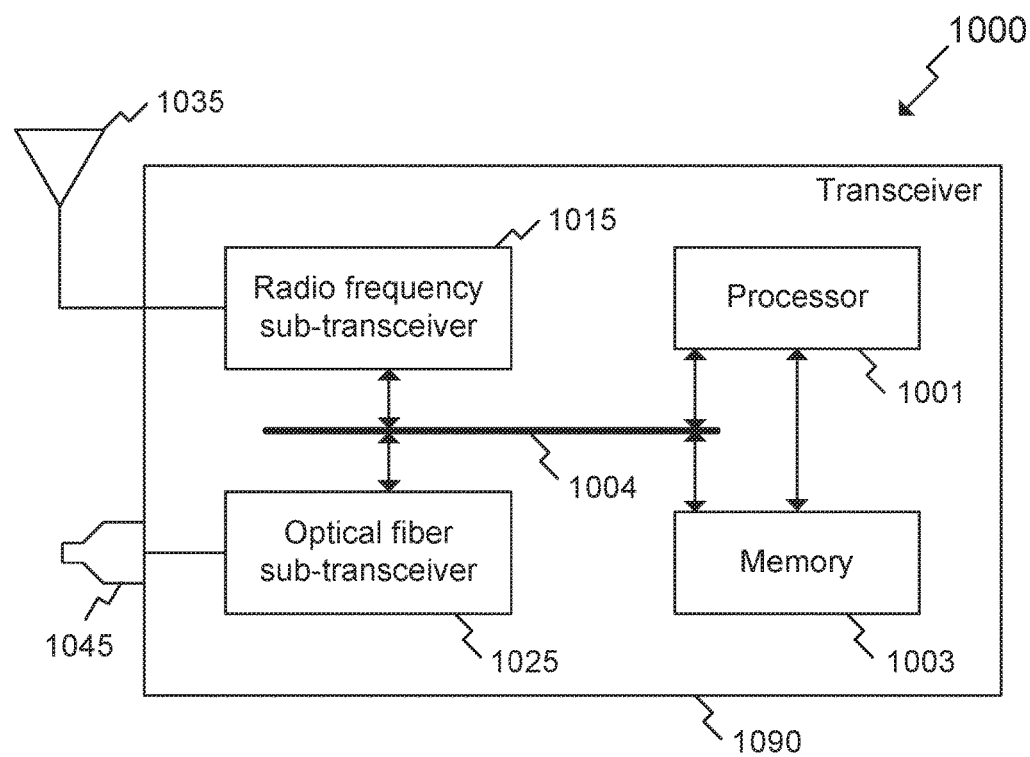
FIGS. 10A and 10B are simplified diagrams of a transceiver for improving communication using an alternate link, according to embodiments of the present invention.
Figure 10B:
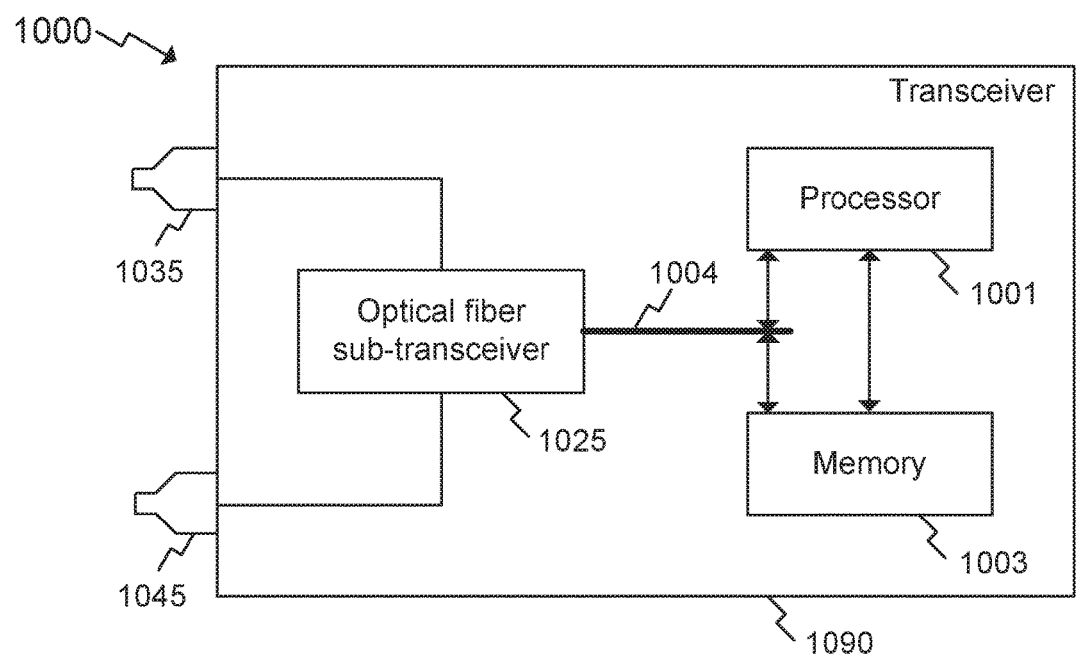

A transceiver for improving communication using an alternate link, and that implements embodiments of the present invention, are shown in FIGS. 10A and 10B. The transceiver 1090 in FIG. 10A comprises a processor 1001 that is connected to a memory 1003, which interfaces with an RF sub-transceiver 1015 and an optical fiber sub-transceiver 1025 via an interface 1004. The RF sub-transceiver 1015 can communicate over a wireless channel using an antenna 1035, and the optical fiber sub-transceiver 1025 uses an optical fiber connector 1045 to communicate over the optical fiber.

In an embodiment, either the RF sub-transceiver 1015 or the optical fiber sub-transceiver 1025, or both, may be embedded in the processor 1001. In other embodiments, one or both of the sub-transceivers may be implemented in a field programmable gate array (FPGA), in software, an ARM, another processor, or the like.

In the embodiment shown in FIG. 10B, and in the context of the system shown in FIG. 3D, the processor 1001 and memory 1003 interface with an optical fiber sub-transceiver 1025 via an interface 1004. The optical fiber sub-transceiver 1025 controls the optical fiber connectors (1035 and 1045) for the primary and alternate fiber optic links, respectively.

The processor 1001 shown in FIGS. 10A and 10B may comprise component digital processors, and may be configured to execute computer-executable program instructions stored in memory 1003. For example, the component processors and sub-transceivers may execute one or more computer programs for enabling communication using heterogeneous links in accordance with embodiments of the present invention.

Processor 1001 may comprise a variety of implementations for programming one or both of the sub-transceivers 1015 and 1025, communicating with the embedded radio definition module, and receiving one or more parameters, including a microprocessor, a digital signal processor (DSP), an application-specific integrated circuit (ASIC), one or more field programmable gate arrays (FPGAs), state machines, or the like. Processor 1001 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 1003 may comprise a non-transitory computer-readable medium that stores instructions which, when executed by the processor 1001, cause the processor 1001 to perform various steps, such as those described herein. Examples of computer-readable media include, but are not limited to, electronic, optical, magnetic, or other storage or transmission devices capable of providing the processor 1001 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 1001 and the processing described may be in one or more structures, or may be dispersed throughout one or more structures.

Embodiments in accordance with aspects of the present subject matter can be implemented in digital electronic circuitry, computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce modifications to, variations of, and equivalents to such embodiments. For example, features of one or more embodiments of the invention may be combined with one or more features of other embodiments without departing from the scope of the invention. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed:

1. A method for maximizing throughput and minimizing latency on a primary link between a transmitter and a receiver, the transmitter comprising a bit-to-symbol mapper, the receiver comprising an equalizer, a channel comprising a transformation from an output of the bit-to-symbol mapper to an input of the equalizer, the method comprising:
   receiving a first portion of an information signal over the primary link;
   receiving a second portion of the information signal over an alternate link, wherein the alternate link is between the transmitter and the receiver, wherein the second portion corresponds to a subset of the first portion, and wherein a latency of the alternate link is greater than a latency of the primary link;
   generating an estimate of one or more characteristics of at least a portion of the channel based on the first portion and the second portion;
   receiving a third portion of the information signal over the primary link, wherein the third portion is received subsequent to the first portion; and
   equalizing the third portion based on the estimate.

2. The method of claim 1, wherein the information signal comprises header data and payload data, and wherein the first, second and third portions consist of the payload data.

3. The method of claim 1, wherein the primary link is a wireless link, and wherein the alternate link is a fiber optic link, wherein the wireless link is selected from the group consisting of a high frequency link operating in the range of 2 MHz to 40 MHz, a free-space optical (FSO) link, a tropospheric scatter communication link, a very high frequency (VHF) link operating in the range of 40 MHz to 300 MHz, an ultra-high frequency (UHF) link operating in the range of 300 MHz to 2 GHz, and a microwave link operating at a frequency in the range of 2 GHz and 90 GHz, and wherein a reliability of the alternate link is greater than a reliability of the primary link.

4. The method of claim 1, wherein the primary link is a first type of fiber optic link, wherein the alternate link is a second type of fiber optic link.

5. The method of claim 1, wherein the primary link uses a first dimension in a transmission medium, wherein the alternate link uses a second dimension in the transmission medium, and wherein the first dimension is quasi-orthogonal to the second dimension.

6. The method of claim 5, wherein the transmission medium is an optical fiber, wherein the first dimension is light of a first wavelength, and wherein the second dimension is light of a second wavelength.

7. The method of claim 5, wherein the transmission medium is free space, wherein the first dimension is a first set of frequencies, and wherein the second dimension is a second set of frequencies that does not overlap with the first set of frequencies.

8. The method of claim 5, wherein the transmission medium is free space, wherein the first dimension is a first set of timeslots, wherein the second dimension is a second set of timeslots that does not overlap with the first set of timeslots.

9. The method of claim 1, wherein generating the estimate is based on a correlation.

10. The method of claim 9, wherein the first portion comprises a plurality of samples, wherein the second portion comprises a plurality of bits, wherein the plurality of bits is modulated to generate a plurality of reference samples, and wherein the correlation is computed between the plurality of samples and the plurality of reference samples.

11. The method of claim 1, wherein the equalizer is selected from the group consisting of a zero-forcing equalizer, a minimum mean-squared error equalizer, a maximum a posteriori equalizer, a maximum likelihood equalizer, a decision feedback equalizer, and a neural network equalizer.

12. The method of claim 1, further comprising:
performing at least one of timing recovery, synchronization, direct current (DC) offset removal, in-phase and quadrature (I/Q) imbalance compensation, and frequency-offset estimation based on the subset of the first portion and the second portion.

13. An apparatus for maximizing throughput and minimizing latency on a primary link, comprising:
a receiver configured to receive a first portion of an information signal over the primary link from a transmitter, receive a second portion of the information signal over an alternate link, and receive a third portion of the information signal over the primary link, wherein the second portion corresponds to a first subset of the first portion, wherein the alternate link is between the transmitter and the receiver, wherein a latency of the alternate link is greater than a latency of the primary link, wherein the transmitter comprises a bit-to-symbol mapper, and wherein the third portion is received subsequent to the first portion;
a channel estimation module configured to generate an initial estimate of one or more characteristics of at least a portion of a channel based on the first portion and the second portion; and
an equalizer configured to equalize the third portion based on the initial estimate, wherein the channel comprises a transformation from an output of the bit-to-symbol mapper to an input of the equalizer.

14. The apparatus of claim 13, wherein the primary link is a first type of fiber optic link, and wherein the alternate link is a second type of fiber optic link.

15. The apparatus of claim 13, wherein the primary link is a wireless link, and wherein the alternate link is a fiber optic link.

16. The apparatus of claim 15, wherein the wireless link is selected from the group consisting of a high frequency link operating in the range of 2 MHz to 40 MHz, a free-space optical (FSO) link, a tropospheric scatter communication link, a very high frequency (VHF) link operating in the range of 40 MHz to 300 MHz, an ultra-high frequency (UHF) link operating in the range of 300 MHz to 2 GHz, and a microwave link operating at a frequency in the range of 2 GHz and 90 GHz, and wherein a reliability of the alternate link is greater than a reliability of the primary link.

17. The apparatus of claim 13, further comprising:
a channel adaptation module configured to update the initial estimate based on a least-squares algorithm, wherein the initial estimate is based on a correlation, and wherein the equalizer is selected from the group consisting of a zero-forcing equalizer, a minimum mean-squared error equalizer, a maximum a posteriori equalizer, a maximum likelihood equalizer, a decision feedback equalizer, and a neural network equalizer.

18. The apparatus of claim 17, wherein the least-squares algorithm is selected from the group consisting of least mean squares, batch least squares, normalized least mean squares, recursive least squares, lattice recursive least squares, and normalized lattice recursive least squares.

19. The apparatus of claim 17, wherein the first portion comprises a plurality of samples, wherein the second portion comprises a plurality of bits, and wherein the bit-to-symbol mapper is configured to modulate the plurality of bits to generate a plurality of reference samples, and wherein the correlation is computed between the plurality of samples and the plurality of reference samples.

20. A non-transitory tangible computer-readable medium embodying program code executable by a computing system, the program code comprising:
program code for receiving a first portion of an information signal over a primary link between a transmitter and a receiver, wherein the transmitter comprises a bit-to-symbol mapper, and wherein the receiver comprises an equalizer;
program code for receiving a second portion of the information signal over an alternate link, wherein the alternate link is between the transmitter and the receiver, wherein the second portion corresponds to a subset of the first portion, and wherein a latency of the alternate link is greater than a latency of the primary link;
program code for generating an estimate of one or more characteristics of at least a portion of a channel based on the first portion and the second portion, wherein the channel comprises a transformation from an output of the bit-to-symbol mapper to an input of the equalizer;
program code for receiving a third portion of the information signal over the primary link, wherein the third portion is received subsequent to the first portion; and
program code for equalizing the third portion based on the estimate.

* * * * *